United States Patent
Ohmi et al.

(10) Patent No.: US 6,302,130 B1
(45) Date of Patent: Oct. 16, 2001

(54) METHOD AND APPARATUS FOR DETECTION OF ORIFICE CLOGGING IN PRESSURE-TYPE FLOW RATE CONTROLLERS

(75) Inventors: Tadahiro Ohmi, 1-17-301 Komegahukuro 2-chome, Aoba-ku, Sendai-shi, Miyagi 980-0813; Seiichi Iida, Hyogo; Satoshi Kagatsume; Jun Hirose, both of Yamanashi; Kouji Nishino, Osaka; Nobukazu Ikeda, Osaka; Michio Yamaji, Osaka; Ryousuke Dohi, Osaka; Kazuhiro Yoshikawa, Osaka; Mutsunori Koyomogi, Osaka; Tomio Uno, Osaka; Eiji Ideta, Osaka; Takashi Hirose, Osaka, all of (JP)

(73) Assignees: Fujikin Incorporated, Osaka; Tadahiro Ohmi, Miyagi; Tokyo Electron Ltd., Tokyo, all of (JP)

( * ) Notice: Subject to any disclaimer, the term of this patent is extended or adjusted under 35 U.S.C. 154(b) by 0 days.

(21) Appl. No.: 09/529,985

(22) PCT Filed: Aug. 9, 1999

(86) PCT No.: PCT/JP99/04310

§ 371 Date: Jul. 18, 2000

§ 102(e) Date: Jul. 18, 2000

(87) PCT Pub. No.: WO00/11531

PCT Pub. Date: Mar. 2, 2000

(30) Foreign Application Priority Data

Aug. 24, 1998 (JP) .................................................. 10-236653

(51) Int. Cl.$^7$ ....................................................... F17D 1/16
(52) U.S. Cl. ......................... 137/14; 137/486; 137/487.5; 137/557; 340/611
(58) Field of Search ............................... 137/487.5, 486, 137/557, 14; 340/606, 611

(56) References Cited

U.S. PATENT DOCUMENTS

| | | | |
|---|---|---|---|
| 5,062,446 | * 11/1991 | Anderson | 137/468 |
| 5,129,418 | * 7/1992 | Shimomura et al. | 137/486 |
| 5,791,369 | * 8/1998 | Nishino et al. | 137/269 |
| 6,152,168 | * 11/2000 | Ohmi et al. | 137/487.5 |

* cited by examiner

*Primary Examiner*—A. Michael Chambers
(74) *Attorney, Agent, or Firm*—Griffin & Szipl, P.C.

(57) ABSTRACT

A method and apparatus for detection of clogging of an orifice by measuring the upstream side pressure without breaking up the piping system in a flow rate control unit using an orifice, so as to extend the life of the flow rate control unit and enhance its safety. The apparatus of detecting clogging of an orifice in a pressure-type flow rate controller has a control valve (CV), an orifice (2), a pressure detector (14) for measuring the upstream pressure $P_1$ therebetween, and a flow rate setting circuit (32) wherein, with the upstream pressure $P_1$ maintained about two or more times higher than the downstream pressure $P_2$, the downstream flow rate $Q_C$ is calculated with the equation $Q_C = KP_1$ (K=constant) and wherein the control valve (CV) is controlled by the difference signal $Q_Y$ between the calculated flow rate $Q_C$ and the set flow rate $Q_S$. The apparatus comprises:

a storage memory M memorizing standard pressure attenuation data Y(t) of the upstream pressure $P_1$ measured with the flow rate switched from the high set flow rate $Q_{SH}$ to the low set flow rate $Q_{SL}$ with the orifice (2) not clogged, a pressure detector (14) for determination of the pressure attenuation data P(t) of the upstream pressure $P_1$ with the flow rate switched from the high set flow rate $Q_{SH}$ to the low set flow rate $Q_{SL}$ with the orifice (2) in the actual conditions, a central processing unit CPU for checking the pressure attenuation data P(t) against standard pressure attenuation data Y(t), and an alarm circuit (46) that turns on a clogging alarm when the pressure attenuation data P(t) deviates from standard pressure attenuation data Y(t) to a specific degree or beyond that.

10 Claims, 13 Drawing Sheets

METHOD AND APPARATUS FOR DETECTION OF ORIFICE CLOGGING IN PRESSURE-TYPE FLOW RATE CONTROLLERS

BACKGROUND OF THE INVENTION

1. Field of the Invention

The present invention relates to pressure-type flow rate controllers for a variety of fluids including gases, for use in the manufacture of semiconductors, chemicals, precision machine parts, and the like. More specifically, this invention relates to a method and apparatus for the detection of the clogging of the orifice in the flow rate controller.

2. Description of the Prior Art

In the past, mass flow rate controllers have been widely used for control with precision of the flow in fluid feeding systems for facilities for manufacturing semiconductors and chemicals.

However, the mass flow rate controller has presented various problems including: (1) relatively slow response in the case of the heat type flow rate sensor, (2) poor control precision in low flow rate region and lack of product-to-product precision uniformity, (3) frequent occurrence of operating troubles and low operation reliability, and (4) high price and expensive replacement parts, which means high running costs.

Seeking a solution to those problems, the inventors of the present invention conducted extensive research and succeeded in developing a pressure-type flow rate control system using an orifice as disclosed in Japanese patent application laid open unexamined under 08-338546.

The pressure-type flow rate control system works on this principle: It has been known that the flow velocity of a gas passing through a nozzle reaches the sonic velocity if the ratio of the gas pressure upstream of the nozzle to the pressure downstream of the same—$P_2/P_1$ where $P_1$=pressure on the upstream side and $P_2$=pressure on the downstream side—falls below the critical pressure of the gas (in the case of air, nitrogen, etc., about 0.5). In such a state, a change in pressure on the downstream side of the nozzle is no longer propagated to the upstream side. The flow rate of the gas passing through the orifice will be proportional with the pressure $P_1$ on the upstream side of the orifice. As a result, it will be possible to obtain a stabilized mass flow rate corresponding to the state on the upstream side of the nozzle.

In other words, in the event that the orifice diameter is fixed, if the upstream pressure $P_1$ is held twice or more higher than the downstream pressure $P_2$, then the downstream flow rate $Q_C$ of the gas passing through the orifice will be dependent on the upstream pressure $P_1$ only, with a linearity given by the equation $Q_C=KP_1$ (K=constant) being established to a high degree of precision. And, if the orifice is the same, so is the constant K.

The construction of this pressure-type flow rate control system will now be described with reference to FIG. 12.

The flow passage 4 upstream of the orifice 2 is connected to a control valve CV that is operated by a drive 8. The downstream flow passage 6 is led to a fluid reactor (not shown) via a gas take-out joint 12.

The pressure $P_1$ on the upstream side of the orifice 2 is detected by a pressure detector 14, and then sent to an amplifier circuit 16 and displayed on a pressure indicator 22. The output is then digitized by an A/D converter 18 and referred to a calculation circuit 20 where the flow rate Q on the downstream side of the orifice 2 is worked out with the equation $Q=KP_1$ (K=constant).

Meanwhile, the upstream temperature $T_1$ is detected by a temperature detector 24 and output to a temperature revision circuit 30 via an amplifier circuit 26 and an A/D converter 28. There, the flow rate Q is revised for the temperature, and the calculated flow rate $Q_C$ is output to a comparison circuit 36. The calculation circuit 20, the temperature revision circuit 30, and the comparison circuit 36 form a calculation control circuit 38.

A flow rate setting circuit 32 outputs a set flow $Q_S$ to the comparison circuit 36 through an A/D converter 34. The comparison circuit 36 works out a signal difference $Q_Y$ between the calculated flow rate $Q_C$ and the set flow $Q_S$ with the equation $Q_Y=Q_C-Q_S$ and outputs that signal difference $Q_Y$ to the drive 8 through an amplifier circuit 40. The drive 8 regulates the control valve CV in such a way as to bring the difference signal $Q_Y$ to zero, that is, to equalize the downstream flow rate Q with the set flow $Q_S$.

While the pressure-type flow rate control system has the advantage of controlling the downstream flow rate with precision by detecting the upstream pressure $P_1$ only, the drawback is that the tiny orifice tends to clog. The orifice is a hole of the order of microns and dust sometimes clogs the orifice hole, rendering the flow rate uncontrollable.

The piping for a fluid to pass through must be well clean. But cuttings, dust, or the like sometimes remain in the piping and clog the orifice. The clogging of the orifice could cause the flow rate control to fail and make the operation of the whole plant unreliable, turning out large quantities of faulty finished products. Furthermore, some gases could become involved in runaway reactions and trigger explosions. Placing a gasket filter in the piping was tried as a solution to the problem, but that did not work because it could have adverse effects on the conductance of the piping.

FIG. 13 shows flow rate characteristics exhibited when the orifice is clogged in comparison with the flow rate characteristics shown by an orifice after it is purged. Flow rate characteristics shown by the orifice after purging constitute normal performance that can be expected of a clean orifice. In FIG. 13, if the set value is 100 percent, for example, the $N_2$ gas flows at the rate of 563.1 SCCM as indicated by the line with circular marks. The subsequent reaction systems are all designed on the basis of the expected flow rate characteristics of the orifice with no clogging. In the example in FIG. 13, the flow rate given by the clogged orifice decreases to 485 SCCM as indicated by the line with box marks, and the designed reaction can no longer be expected. It is noted that SCCM is the unit of gas flow rate—$cm^3$/minute—under the standard conditions.

As shown, clogging of the orifice can make the flow rate lower than the set value. In semiconductor manufacturing and chemical plants, overfeeding or underfeeding of gases as a starting material could trigger an explosion or result in large quantities of faulty finished products. For this reason, how to detect orifice clogging in those gas-using plants has been a major concern.

SUMMARY OF THE INVENTION

The present invention solves that problem. The present invention as defined in claim 1 provides a method of detecting clogging of an orifice in a pressure-type flow rate controller which has a control valve, an orifice, a pressure detector for measuring the upstream pressure $P_1$ therebetween, and a flow rate setting circuit, wherein with the upstream pressure $P_1$ maintained at about two or more times higher than the downstream pressure $P_2$, the downstream flow rate $Q_C$ is calculated with the equation $Q_C=KP_1$ (K=constant), and wherein the control valve (CV) is controlled by the difference signal $Q_Y$ between the calculated flow rate $Q_C$ and the set flow rate $Q_S$, the method comprising: a first step of holding the set flow rate $Q_S$ at the high set flow rate $Q_{SH}$; a second step of switching from the high set flow rate $Q_{SH}$ to the low set flow rate $Q_{SL}$ and determining the upstream pressure $P_1$ to obtain the pressure attenuation data P(t); a third step of checking said the pressure attenuation data P(t) against standard pressure attenuation data Y(t) measured under the same conditions but with the orifice not clogged; and a fourth step of turning on a clogging alarm when the pressure attenuation data P(t) deviates from standard pressure attenuation data Y(t) to or beyond a specific degree.

The present invention as defined in claim 4 provides a method of detecting clogging of an orifice in a pressure-type flow rate controller which has a control valve CV, an orifice 2, a pressure detector 14 for measuring the upstream pressure $P_1$ therebetween and a flow rate setting circuit 32 wherein with the upstream pressure $P_1$ maintained about two or more times higher than the downstream pressure $P_2$, the downstream flow rate $Q_C$ is calculated with the equation $Q_C=KP_1$ (K=constant) and wherein the control valve (CV) is controlled by the difference signal $Q_Y$ between the calculated flow rate $Q_C$ and the set flow rate $Q_S$, the method comprising: a first step of holding the set flow rate $Q_S$ at a high set flow rate $Q_{SH}$; a second step of switching from the high set flow rate $Q_{SH}$ to a low set flow rate $Q_{SL}$, measuring the upstream pressure $P_1$ and the upstream temperature $T_1$, and working out pressure attenuation data P(t) from those measured values; a third step of checking the pressure attenuation data P(t) against standard pressure attenuation data Y(t) worked out from the upstream temperature $T_1$ and the upstream pressure $P_1$ measured under the same conditions as with the data P(t) but with the orifice not clogged; and a fourth step of turning on a clogging alarm when the pressure attenuation data P(t) deviates from standard pressure attenuation data Y(t) to or beyond a specific degree.

The present invention as defined in claim 7 provides an apparatus of detecting clogging of an orifice in a pressure-type flow rate controller which has a control valve, an orifice, a pressure detector for measuring the upstream pressure $P_1$ therebetween and a flow rate setting circuit wherein with the upstream pressure $P_1$ maintained about two or more times higher than the downstream pressure $P_2$, the downstream flow rate $Q_C$ is calculated with the equation $Q_C=KP_1$ (K=constant) and wherein the control valve (CV) is regulated by the difference signal $Q_Y$ between the calculated flow rate $Q_C$ and the set flow rate $Q_S$, the apparatus comprising: a storage memory M memorizing standard pressure attenuation data Y(t) of the upstream pressure $P_1$ measured with the flow rate switched from the high set flow rate $Q_{SH}$ to the low set flow rate $Q_{SL}$ with the orifice (2) not clogged; a pressure detector (14) for determination of the pressure attenuation data P(t) of the upstream pressure $P_1$ measured with the flow rate switched from the high set flow rate $Q_{SH}$ to the low set flow rate $Q_{SL}$ with the orifice in the actual conditions; and a central processing unit CPU for checking the pressure attenuation data P(t) against standard pressure attenuation data Y(t) and an alarm circuit (46) for turning on a clogging alarm when the pressure attenuation data P(t) deviates from standard pressure attenuation data Y(t) to or beyond a specific degree.

The present invention as defined in claim 9 provides an apparatus of detecting clogging of an orifice in a pressure-type flow rate controller which has a control valve CV, an orifice 2, a pressure detector 14 for measuring the upstream pressure $P_1$ therebetween and a flow rate setting circuit 32 wherein with the upstream pressure $P_1$ maintained about two or more times higher than the downstream pressure $P_2$, the downstream flow rate $Q_C$ is calculated with the equation $Q_C=KP_1$ (K=constant) and wherein the control valve (CV) is regulated by the difference signal $Q_Y$ between the calculated flow rate $Q_C$ and the set flow rate $Q_S$, the apparatus comprising: a pressure detector 14 for measuring the upstream pressure P; a temperature detector 24 for detecting the upstream temperature T; a storage memory M memorizing standard pressure attenuation data Y(t) of the upstream pressure $P_1$ worked out from the upstream temperature $T_1$ and the upstream pressure $P_1$ measured with the flow rate switched from the high set flow rate $Q_{SH}$ to the low set flow rate $Q_{SL}$ with the orifice 2 not clogged; a central processing unit CPU for working out the standard pressure attenuation data Y(t), calculating the pressure attenuation data P(t) of the upstream pressure $P_1$ on the basis of the upstream pressure $P_t$ and upstream temperature $T_t$ measured with the flow rate switched from the high set flow rate $Q_{SH}$ to the low set flow rate $Q_{SL}$ with the orifice 2 in the actual conditions, and furthermore checking the pressure attenuation data P(t) against standard pressure attenuation data Y(t); and an alarm circuit 46 for turning on a clogging alarm when the pressure attenuation data P(t) deviates from standard pressure attenuation data Y(t) to or beyond a specific degree.

Figure 1:
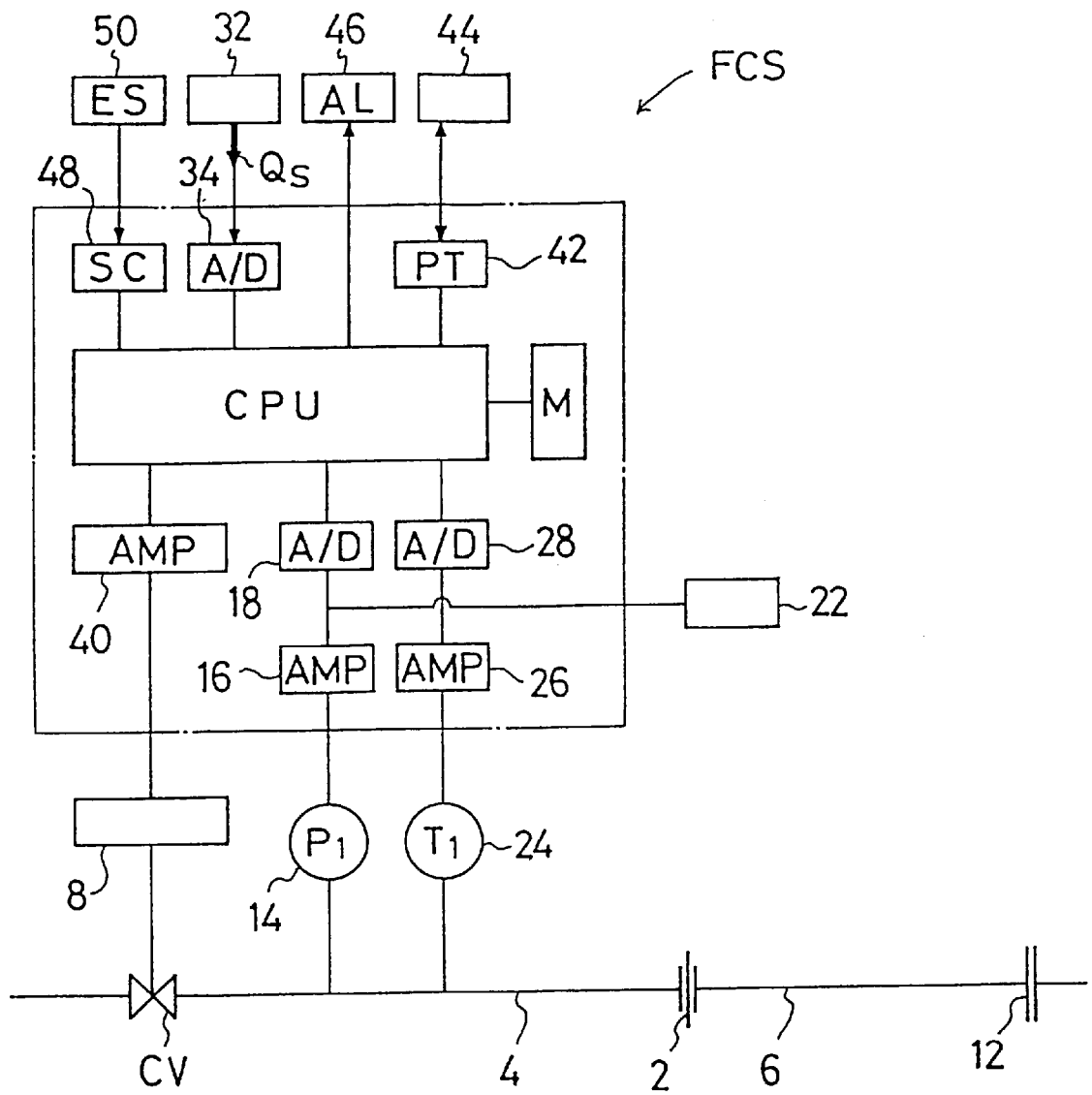
FIG. 1 is a block diagram of an example of the apparatus for detection of the clogging of the orifice embodying the present invention in the flow rate control system.

| LIST OF REFERENCE NUMERALS |
| --- |
| 2 orifice |
| 4 upstream flow passage |
| 6 downstream flow passage |
| 8 drive |
| 10 orifice-adapted valve |
| 12 joint for tapping gas |
| 14 pressure detector |
| 16 amplifier circuit |
| 18 A/D converter |
| 20 calculation circuit |
| 22 pressure indicator |
| 24 temperature detector |
| 26 amplifier circuit |
| 28 A/D converter |
| 32 flow rate setting circuit |
| 34 A/D converter |
| 36 comparison circuit |
| 38 calculation control circuit |
| 40 amplifier circuit |
| 42 communication port PT |
| 44 external circuit |
| 46 alarm circuit |
| 48 power source circuit |
| 50 external power source |
| AMP amplifier circuit |
| A/D AD converter |
| AL alarm signal |
| CPU central processing unit (CPU) |
| CV control valve |
| ES external power source |
| M storage memory |
| SC power source circuit |

DESCRIPTION OF THE PREFERRED EMBODIMENTS

Figure 12:
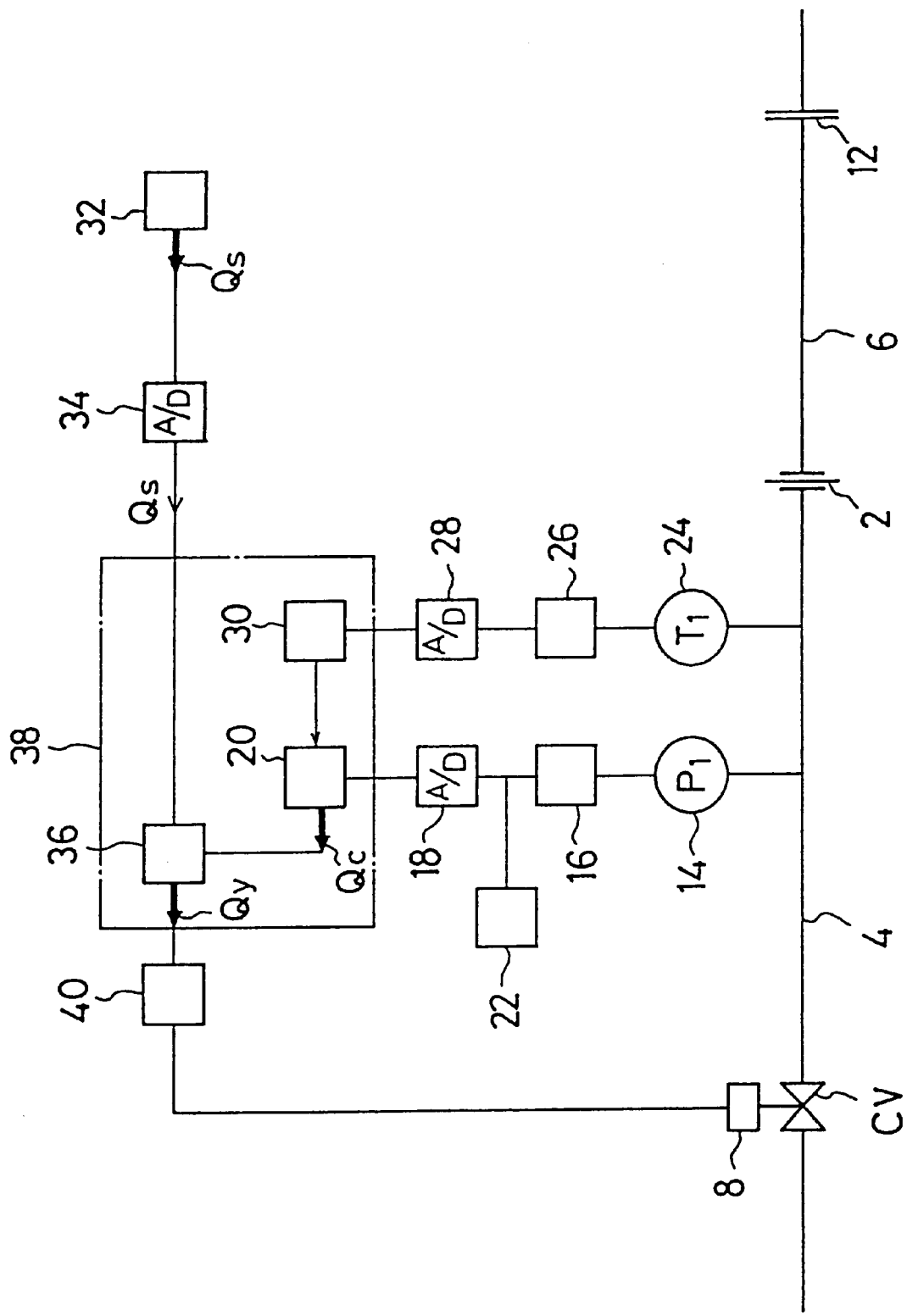
FIG. 12 is a block diagram of the prior art pressure-type flow rate controller.
Figure 13:
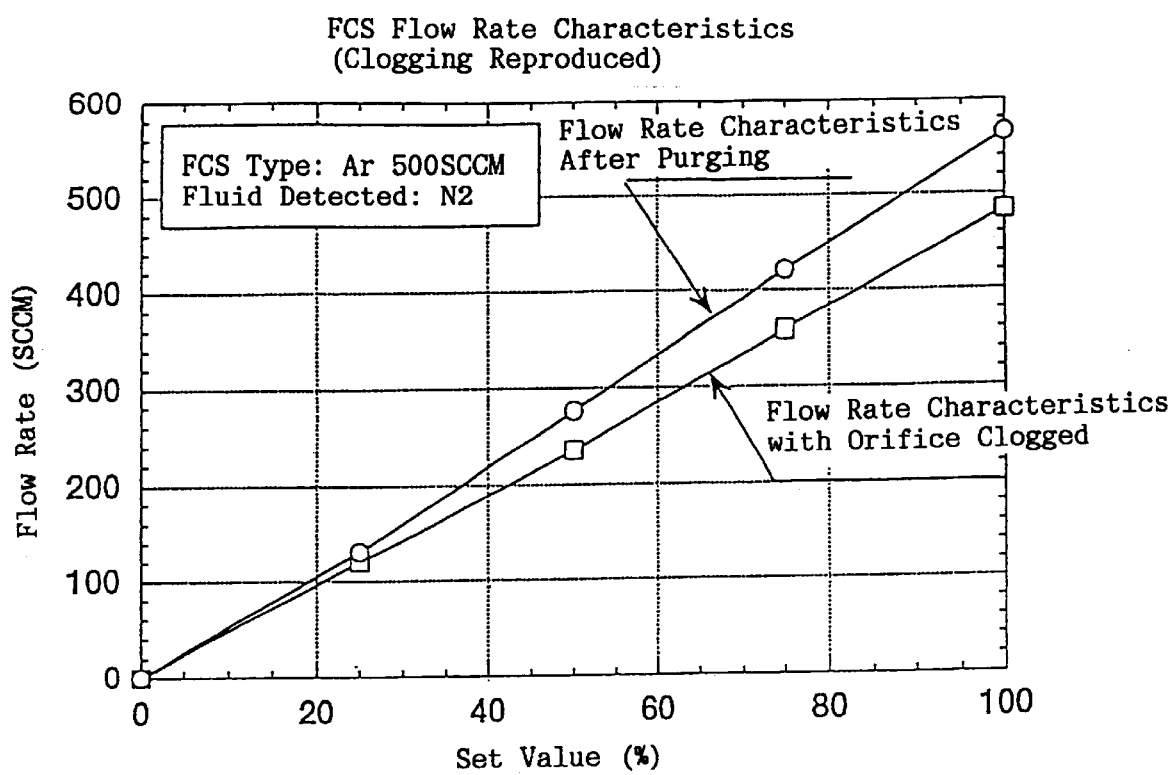
FIG. 13 is a graph comparing flow characteristics between an orifice purged clean and clogged orifice, measured under the same conditions.

The present invention concerns a method and apparatus for detecting clogging of an orifice in the same pressure-type flow rate control system, such as the one shown in FIG. 12, which works on the following principle. That is to say, if the upstream pressure $P_1$ is held twice or more higher than the downstream pressure $P_2$, then the flow rate $Q_C$ of the gas downstream of the orifice will be dependent on the upstream pressure $P_1$ only, with a linearity given by the equation: $Q_C=KP_1$ (K=constant) being established to a high degree of precision. The proportional constant K is dependent on the orifice diameter. In other words, the constant K is fixed as long as the same orifice is used. It is only when the orifice is replaced with another orifice of different diameter that the constant K changes.

To regulate the flow rate of a specific fluid to a specific flow rate $Q_S$, therefore, the control valve CV is manipulated to regulate the upstream pressure $P_1$ so that $P_1=Q_S/K$ is achieved. That is, the upstream pressure $P_1$ is constantly monitored and the control valve CV is operated on the base of the upstream pressure $P_1$ alone.

FIG. 1 shows an example of the clogging detection apparatus incorporated in the pressure-type flow rate controller embodying the present invention. This arrangement is identical with the apparatus shown in FIG. 12 in function except that the present invention is microcomputer-controlled. In FIG. 1, the parts identical with those in FIG. 12 are designated by like reference characters. Consequently, the following description is limited to the parts having different characters.

CPU indicates a central processing unit and corresponds to the calculation control circuit 38 in FIG. 12 while M denotes a storage memory M. The reference numeral 42 indicates a port PT for communication with the outside; 44 an outside circuit such as a trigger; 46 a circuit for alarming in the event of clogging; 48 a power source circuit SC; and 50 an outside power source for ±15 volts. AMP designates an amplification circuit while A/D indicates an A/D converter.

The control valve CV used is a so-called direct-through type metal diaphragm valve, while the drive 8 is a piezo-electric type drive unit. The alternatives to this drive for the control valve 2 include magnetostrictive type drive units or solenoid-type drive units, motor-type drive units, pneumatic-type drive units, and thermal expansion drive units.

The pressure detector 14 indicated is a semiconductor restrictive type. The alternatives to this pressure detector 14 include metal foil restrictive pressure sensors, capacitance-type sensors, and magnetic resistance-type pressure sensors.

The temperature detector 24 is a thermocouple-type temperature sensor. A variety of known temperature sensors such as resistance bulb-type temperature sensors may be used in place of that.

The orifice 2 used is a bore formed in a metal sheet gasket by cutting. Alternatives to this may be known orifices such as ultrathin pipes and orifices formed in metal film by etching or electric discharge machining.

The pressure-type flow rate control system using an orifice will be hereinafter referred to as the pressure-type flow rate control system FCS. The arrangement shown in FIG. 1 is a pressure-type flow rate control system including the apparatus for detection of the clogging of the orifice embodying the present invention.

There will now be described the normal flow rate control mode of the pressure-type flow rate control system FCS shown in FIG. 1 with reference to the flow chart in FIG. 2.

Figure 2:
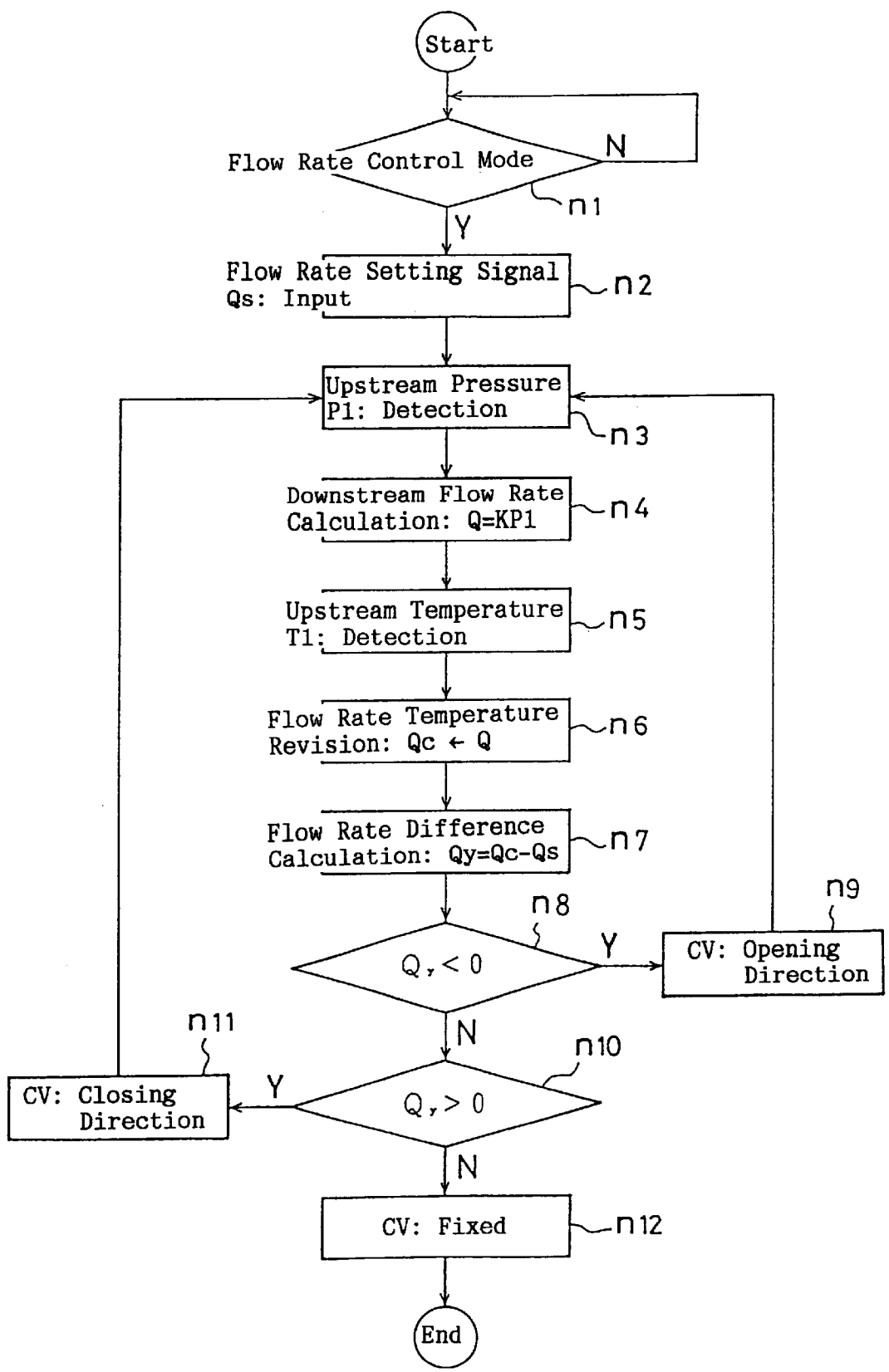
FIG. 2 is a flow chart of the flow rate control when the plant is in operation.

The flow chart in FIG. 2 shows the flow rate control process to be followed during the operation of the plant. The process is carried out by the central processing unit CPU according to a program stored in the storage memory M.

When the flow rate control mode is confirmed in Step n1, the flow rate setting signal (set flow rate) $Q_S$ is input from the flow rate setting circuit 32 (Step n2). The pressure detector 14 measures the upstream pressure $P_1$ (Step n3), and the measurement is referred to the amplifier circuit 16, the A/D converter 18 and the central processing unit CPU where the flow rate Q is worked out with the equation $Q=KP_1$ (K=constant) (Step n4).

At the same time, the upstream temperature $T_1$ is measured by the temperature detector 24 (Step n5). The measurement is passed on to the amplifier circuit 26, the A/D converter 28 and the central processing unit CPU where the flow rate Q is revised for the temperature and converted into a downstream flow rate $Q_C$ (Step n6). In the central processing unit CPU, the difference $Q_Y$ between the downstream flow rate $Q_C$ and the set flow rate $Q_S$ is worked out with the equation $Q_Y=Q_C-Q_S$ (Step n7).

The control valve CV is controlled in the following steps to bring the difference signal $Q_Y$ to zero. First, in case of $Q_Y<0$ (Step n8), the control valve CV is operated in the opening direction by the drive 8 (Step n9). In case of $Q_Y>0$ (Step n10), the control valve CV is operated in the closing direction by the drive 8 (Step n11) and the process returns to Step n3. If $Q_Y=0$, it is judged that the flow rate control is completed and the control valve CV is fixed at the current valve opening degree (Step n12). It is difficult to reduce the flow rate difference $Q_Y$ to exactly zero. Some leeway may be allowed in Step n8 and Step n10.

There will now be described the set flow rate $Q_S$ in the flow rate setting circuit 32. The set flow rate (flow rate setting signal) $Q_S$ is usually given in voltage, and a specific relation between the set flow rate and the upstream pressure $P_1$, that is, $P_1=Q_S/K$, is established. Therefore, a flow rate range indicated in a voltage range between 0 and 5 volts, for example, would correspond to a pressure range between, say, 0 and 3 kgf/cm² abs. If those ranges are indicated in percentage, the 100 percent or full scale point corresponds to 5 volts in the set flow rate $Q_S$ and 3 kgf/cm² abs. in the upstream pressure $P_1$.

If set at 50 percent, for example, the set flow rate $Q_S$ corresponds to 2.5 volts and the upstream pressure $P_1$ of 1.5 kgf/cm² abs. The following description is based on this principle.

There will now be explained the standard pressure attenuation mode for measurement of reference standard attenuation data Y(t) serving as base data for detection of the clogging of the orifice. This standard pressure attenuation mode is to examine how the upstream pressure $P_1$ will attenuate when, with an orifice not clogged, the control valve is actuated from fully opened state to fully closed state. The data thus obtained will be a basis against which the data obtained with the orifice clogged is checked.

Embodiment 1 for Detecting Orifice Clogging

Figure 3:
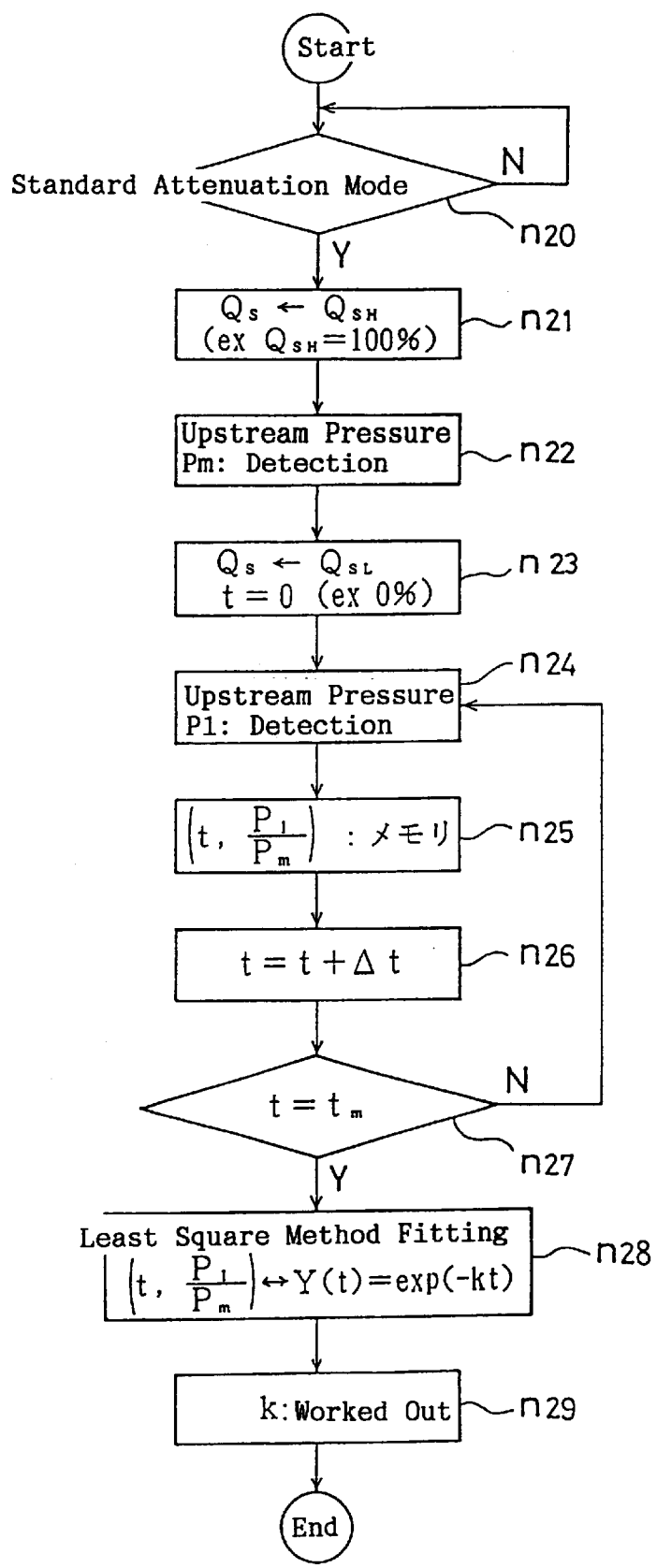
FIG. 3 is a flow chart for working out standard pressure attenuation data Y(t) used in the method of detecting the clogging in a first embodiment of the present invention.

Shown in FIG. 3 is a flow chart of the standard pressure attenuation mode, which is used for the method for detection of clogging according to a first embodiment.

The program stored in the storage memory M is actuated by signals from the external circuit 44. If the standard pressure attenuation mode is confirmed (n20), a high set flow rate $Q_{SH}$ is set as the set flow rate $Q_S$ in the central processing unit CPU (Step n21). The high set flow rate $Q_{SH}$ is usually a full 100 percent flow rate. In this state, the upstream pressure $P_1$ is measured and the measurement is indicated as the maximum pressure $P_m$ (Step n22), which pressure is a maximum value in this flow rate range. At a trigger signal from the external circuit 44, a low set flow rate $Q_{SL}$ is set as set flow rate $Q_S$. This moment is taken as t=0 (s) (Step n23). The low set flow rate $Q_{SL}$ is usually 0 percent. In other words, the attenuation of the upstream pressure $P_1$ is determined with the upstream pressure $P_1$ being reduced from the maximum to zero (at which the control valve is fully closed).

The upstream pressure $P_1$ is measured starting at t=0 (Step n24), and the measuring time and pressure data—t, $P_1P_m$— are stored in the storage memory M (n25). The pressure data are given in a ratio of $P_1P_m$ merely to indicate pressure measurements, with the maximum pressure $P_m$ serving as basis. The pressure is not always necessary in the form of a ratio. Some other appropriate method may be adopted instead. Measurements are taken at an interval of a small amount of time Δt (Step n26) and measured data—t, $P_1/P_m$—are stored in the storage memory M until the measuring time $t_m$ is reached (Step n27). The measuring time $t_m$ may be optional (for instance, 5 seconds, 20 seconds, or the like) as long as necessary data can be stored within that time. In the next step, Y(t)=exp (−kt) is fitted to the stored data—t, $P_1P_m$—by the method of least squares (Step n28) to work out the attenuation parameter k (Step n29).

For actual measurement, it is so arranged that the measuring time $t_m$ is selectable from among 8 courses ranging in duration from one second to 10 seconds. In the case of an orifice with a bore or inside diameter of 150 microns, the upstream pressure $P_1$ is measured 50 times in one course or the measuring time $t_m$.

Thus, standard pressure attenuation data Y(t) is given in the form of theoretical expression Y(t)=exp (−kt). With the same orifice not clogged, the attenuation parameter k is a fixed value. These standard pressure attenuation data Y(t) are stored in the storage memory M.

Figure 4:
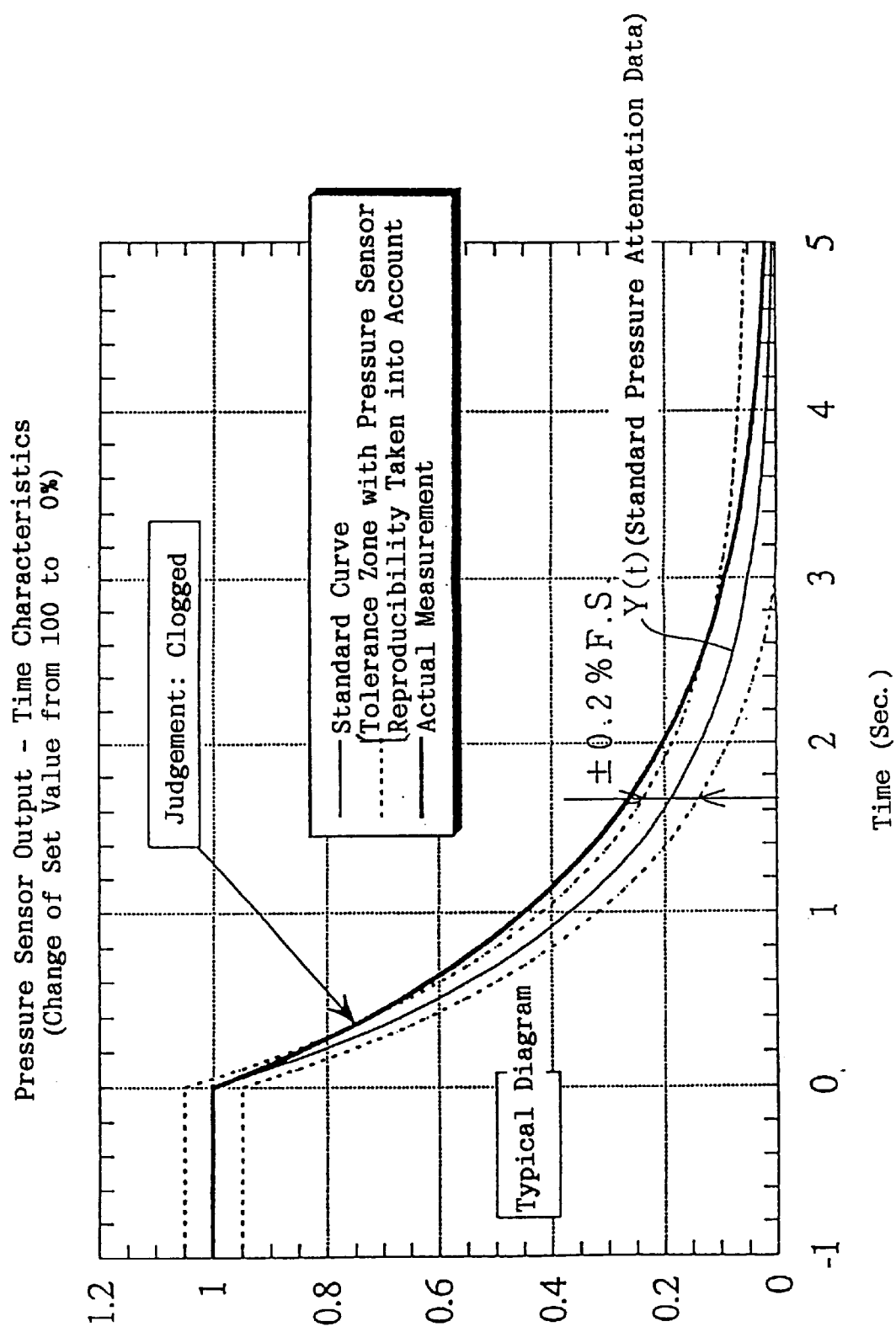
FIG. 4 is a graph of standard pressure attenuation data Y(t) measured with an orifice not clogged and the pressure attenuation data P(t) measured with the orifice clogged.

In FIG. 4, the standard pressure attenuation data Y(t) are indicated in thin solid line with the maximum value being 1. The data are given in the ratio to the maximum, but it does not always have to be done that way. Instead, the upstream pressure $P_1$ as actually measured may be given as attenuation data.

In the preceding example, the change from $Q_{SH}$ to $Q_{SL}$ is 100 percent to 0 percent, that is, full opening to full closure of the control valve CV. The present invention is not limited to that. Instead, $Q_{SH}$ may be set to 50 percent and $Q_{SL}$ to 20 percent, for example. Change from 100 to 0 percent is chosen merely because the attenuation shows a most noticeable curve in this case.

The standard pressure attenuation data Y(t) is data measured under the best conditions of the flow passage with the orifice not clogged. But the state of no clogging in a general sense does not always mean the best conditions. There are cases where even if there is slight clogging, the orifice is judged as not being clogged. In the present example, an error of ±0.2 percent of the full scale value is allowed. In case 1 serves as a basis, the permissible error range is ±0.002. This error range may be changed depending on the circumstances.

Next, the flow factor FF will be explained.

The pressure-type flow rate control system FCS according to the present invention has the advantage of controlling a plurality of kinds of gases with one orifice. As mentioned earlier, it is known that with the same orifice diameter, the downstream flow rate $Q_C$ is worked out with the equation $Q_C=KP_1$(K=constant) as mentioned earlier. It is also known that the constant K differs depending upon the type of gas.

The constants for $N_2$ gas, $A_r$ gas, and $O_2$ gas will be designated as $K_N$, $K_A$, and $K_O$, respectively, in the following description. The constant K is usually expressed in a flow factor FF with nitrogen gas serving as a basis. If the flow factors FF for $N_2$ gas, Ar gas, and $O_2$ gas are designated as $FF_N$, $FF_A$, and $FF_O$, then $FF_N=K_N/K_N=1$, $FF_A=K_A/K_N$, and $FF_O=K_O/K_N$. In other words, the flow factor FF is the ratio of the gas flow rate of the actual gas to the conversion flow rate in terms of $N_2$ gas, that is, FF=flow rate of actual gas/conversion flow rate in terms of $N_2$ gas.

The flow factors for some kinds of gases are given in Table 1.

TABLE 1

| Gas type | Flow factor (FF) |
| --- | --- |
| $N_2$ | 1 |
| $C_4F_8$ | 0.3444 |
| Ar | 0.8885 |
| CO | 1.0 |
| $O_2$ | 0.935 |

FF = flow rate of gas/conversion flow rate in terms of $N_2$ gas

The inventors found that the attenuation parameter k of standard pressure attenuation data Y(t)=exp (−kt) is closely related to the flow factor FF. Like the flow rate, the relation is this: the attenuation parameter of a gas=FF×attenuation parameter of $N_2$ gas. Therefore, if the attenuation parameter $k_N$ of $N_2$ gas is measured, the attenuation parameter k of any gas can be obtained with this equation: $k=FF \times k_N$.

Figure 5:
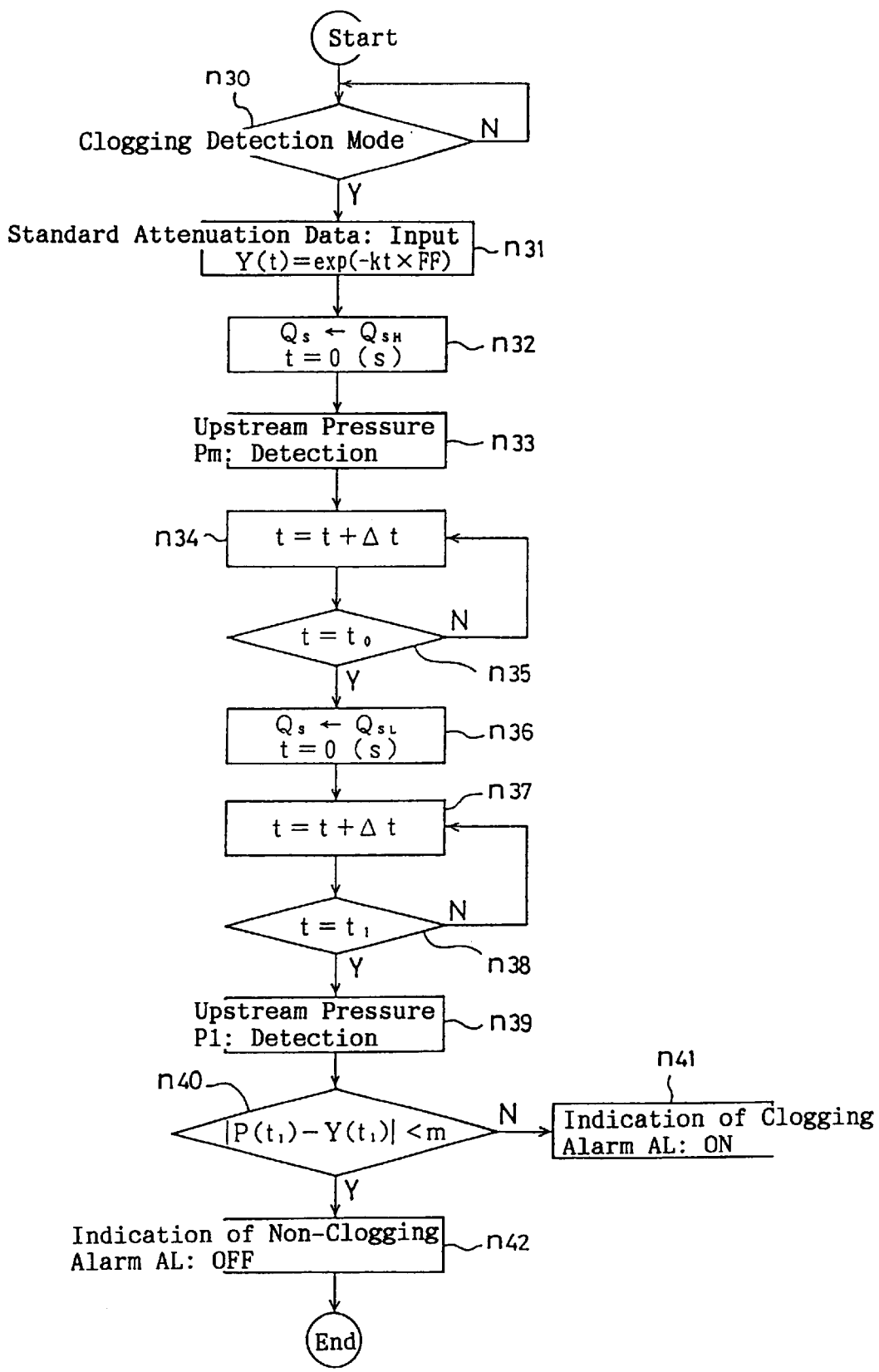
FIG. 5 is a flow chart for carrying out the method of detecting the clogging in the first embodiment of the present invention.

FIG. 5 shows a flow chart for the mode of detecting clogging of an orifice which is actually practiced. It is difficult to detect the clogging when the plant is in operation. Therefore, it is so arranged that when the set flow rate falls to a certain value—a threshold value that can be set at any value exceeding one volt—as the production process ends in the plant, the falling trend of the voltage will be a trigger signal for starting up the clogging detection mode.

In the present example, if the set flow rate falls to one volt, then the trigger signal $Tr_1$ is input in the central processing unit CPU. It is confirmed from this signal that the mode is for detection of the clogging (Step n30). And the storage memory M sends standard pressure attenuation data Y(t) to the central processing unit CPU (Step n31). The data may be either Y(t) for the gas to be actually measured or the attenuation parameter k for $N_2$ gas and the flow factor FF. In the latter case, standard pressure attenuation data Y(t) for the actual gas can be calculated by the equation $Y(t) = \exp(-kt \times FF)$.

In the present example, a table as shown below is stored as Y(t) in the storage memory M at the initial setting time. The table is taken for comparison to detect clogging.

TABLE 2

| Time, msec. | Pressure sensor output, volts |
| --- | --- |
| 0 | 5.00 |
| 20 | 4.20 |
| 40 | 3.80 |
| 60 | 3.50 |
| . | . |
| . | . |
| . | . |
| 1000 | 0.00 |

In the next step, the high set flow rate $Q_{SH}$ is input. With this moment designated as t=0 (s) in a pressure measuring cycle as shown in Table 2, the time counting is started (Step n32), and the upstream pressure $P_1$ is measured. This measurement is taken as the maximum pressure $P_m$ (Step n33). Time counting (with measurement) is repeated a number of times at an interval of a small amount of time $\Delta t$ (Step n34) until a set time—the high set time $t_o$—is reached (Step n35). Then, the flow rate is switched to the low set flow rate $Q_{SL}$ with the time counting reset to t=0 second (Step n36). In the present example, it is so arranged that the high set time $t_o$ comes 1 second after the high set flow rate $Q_{SH}$ is input, with the high set flow rate $Q_{SH}$=100 percent and the low set flow rate $Q_{SL}$=0 percent. The high set time to may be selected as desired as long as it is a time at which the upstream pressure $P_1$ is stable.

Further, time counting (with measurement) is repeated many times at an interval of a small amount of time $\Delta t$ (Step n37) until another set time—the low set time $t_1$—is reached (Step n38). Then, the upstream pressure $P_1(t_1)$ is detected (Step n39). If the pressure attenuation data $P(t_1)$ (given in relation to maximum pressure $P_m$)=$P_1(t_1)/P_m$ is within the standard pressure attenuation data $Y(t_1) \pm$ an error m (Step n40), the display will indicate no clogging, with the alarm signal AL turned off (Step n42). If that is not the case, i.e., if the data is beyond the error range (Step n40), the display will indicate clogging, with the alarm signal AL being turned on (Step n41).

The low set time $t_1$ is a comparative time and may be 0.6 second or 1.6 seconds, for example; any is acceptable so long as it is convenient for comparison. In the example, it is also noted, the pressure attenuation data P(t) is given in the ratio of the upstream pressure $P_1$ (t) to the maximum pressure $P_m$. It is not always necessary to give the upstream pressure $P_1(t)$ in relation to the maximum pressure $P_m$. In case the upstream pressure $P_1(t)$ is not given in ratio, it is better not to express standard pressure attenuation data Y(t) in ratio, either. In that case, the calculation formula in Step n40 will be $|P_1(t_1)-Y(t_1)|/P_m<n$. That is, if the pressure attenuation data $P_1(t)$ is given in ratio, $P(t)=P_1(t)/P_m$. If not, the equation should be $P(t)=P_1(t)$. In addition, there is a constant for the pressure attenuation data P(t). What is important is that the constants for P(t) and Y(t) should be set in the same conditions except for the clogging.

In the present example, the error m is set at 0.2 percent of F.S., that is, m=0.002. This error range is merely a scope where the orifice is assumed unclogged. It is not restrictive, but may be set at 0.5 percent of F.S., that is, m=0.005, for example, depending on the precision desired.

In the present example as shown in FIG. 5, clogging is checked at one point of $t=t_1$. That is not restrictive, but it is checked at a plurality of points. Clogging may be checked at more points over the whole pressure attenuation curve.

In practice, clogging is checked continuously at 4 or 5 points of $t=t_1 \sim t=t_n$. Differences between the initial standard values and measured values at respective points are added up and averaged. The average is the basis for final judgement on clogging.

As is clear from FIG. 4 showing the pressure attenuation curves, the zone between two dotted lines with a thin solid line as median line is a region where no clogging is caused. The thin solid line represents measurements with the orifice not clogged, while the dotted lines indicate an error range of ±0.2 percent of F.S. The thick solid line denotes pressure attenuation data indicated in the ratio. At a point some 1.6 second after the starting point, the measured data are outside the dotted zone, indicating that the orifice is clogged. The alarm is turned on.

Figure 6:
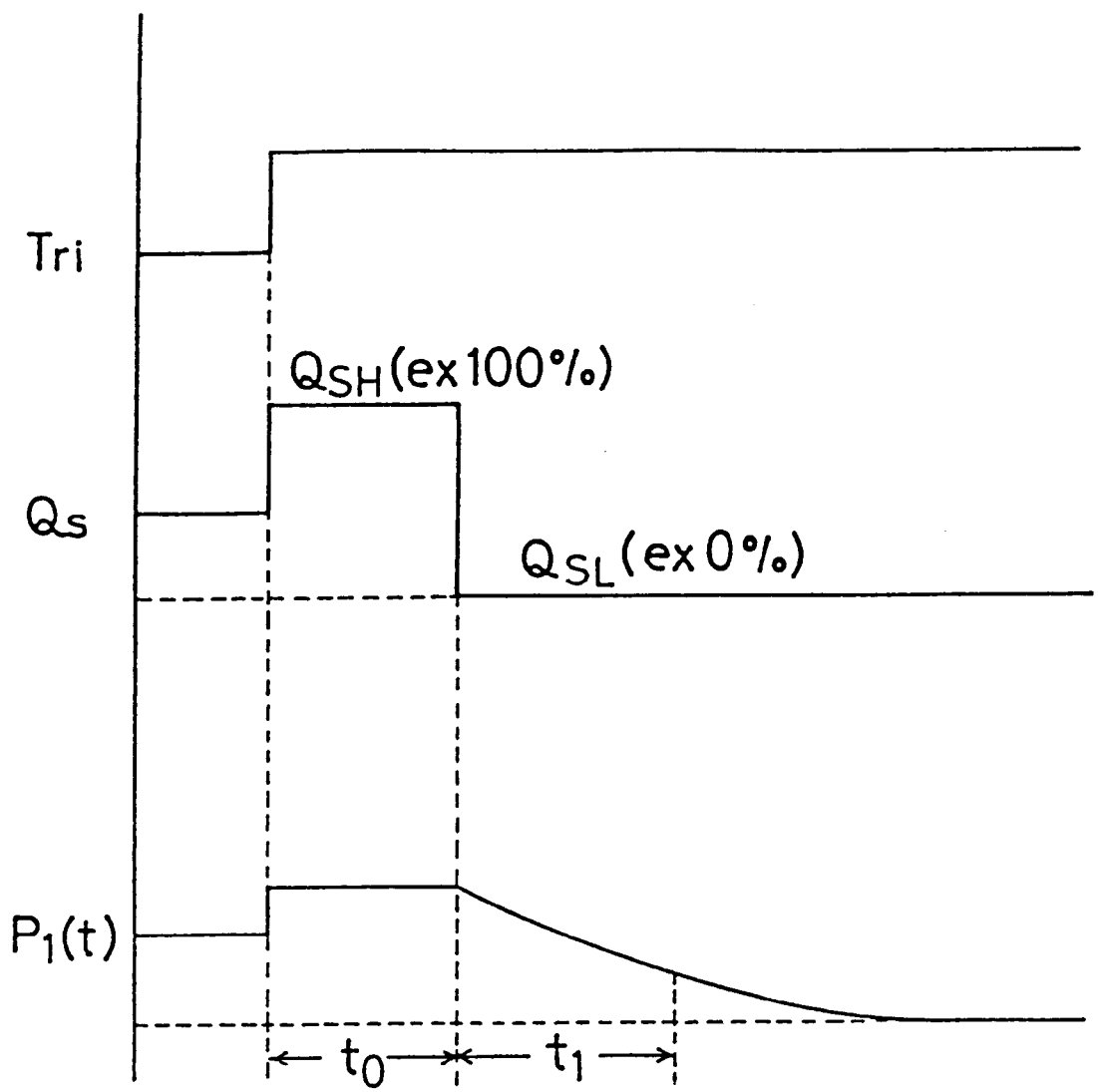
FIG. 6 is a time chart for different signals.

Shown in FIG. 6 is a time chart of signals in the example shown in FIG. 5. The rise of the trigger signal $T_{ri}$ inputs the high set flow rate $Q_{SH}$. At the passage of $t_o$ seconds, the process is set to the low set flow rate $Q_{SL}$. Then, the pressure attenuation data P(t) as detected at the passage of $t_1$ seconds is measured. If the measurement is found to be outside the error range, the alarm signal AL will be turned on.

In the present invention, standard pressure attenuation data Y(t) and the pressure attenuation data P(t), in the form of a ratio or not, may be used.

The present invention is not limited to those examples just described, but embraces variations and changes in design without departing from the spirit and scope of the present invention.

Embodiment 2 for Detecting Orifice Clogging

Figure 7:
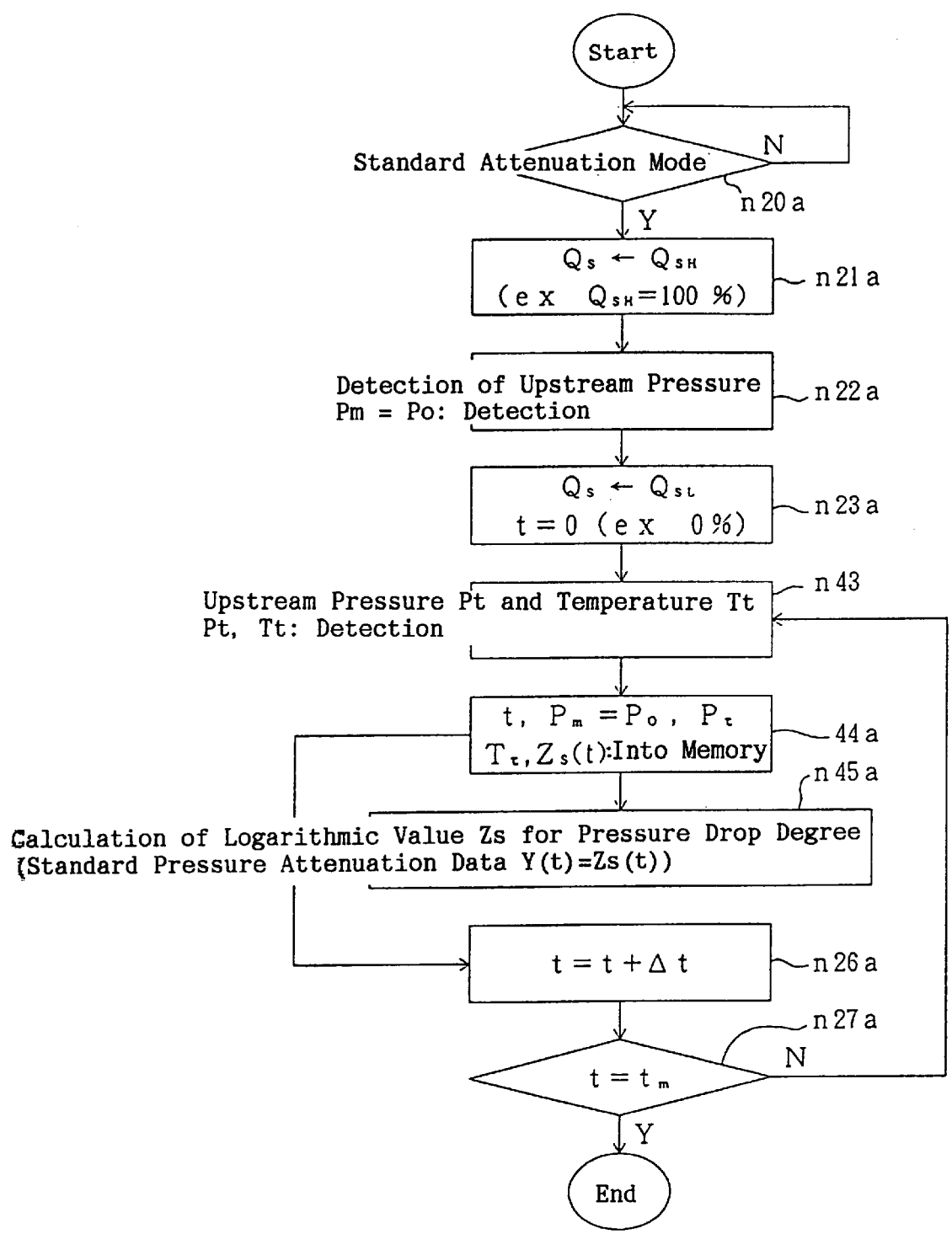
FIG. 7 is a flow chart for working out standard pressure attenuation data Y(t) which is to be used in the method of detecting the clogging in a second embodiment of the present invention.

FIG. 7 is a flow chart for the standard pressure attenuation mode to obtain standard pressure attenuation data Y(t) which is to be used as basic data in the method of detecting the clogging in a second embodiment of the present invention. This flow chart corresponds to that shown in FIG. 3 in the first embodiment.

In the first embodiment in FIG. 3, no consideration is given at all to the effect on pressure attenuation of the fluid temperature T on the upstream side of the orifice in working out standard pressure attenuation data Y(t). That is also the case with measurement of pressure attenuation data P(t) in the mode for detecting the clogging as shown in FIG. 5.

In the detection of clogging in practice, meanwhile, the fluid temperature T taken in working out standard pressure attenuation data Y(t) is rarely identical with the fluid temperature T taken in checking for clogging. Rather, it is usual that the two temperatures are different from each other.

When the clogging is checked by the method of the above-mentioned first embodiment, if there is a difference between that the fluid temperature T on the upstream side of the orifice taken in working out standard pressure attenuation data Y(t) and the fluid temperature T on the upstream side of the orifice taken in measuring the pressure attenuation data P(t), the clogging checking precision will be affected. To be specific, experiments have shown that a temperature difference of some 10° C. would cause an error of some 3 percent in the detected values of the clogging are.

Figure 8:
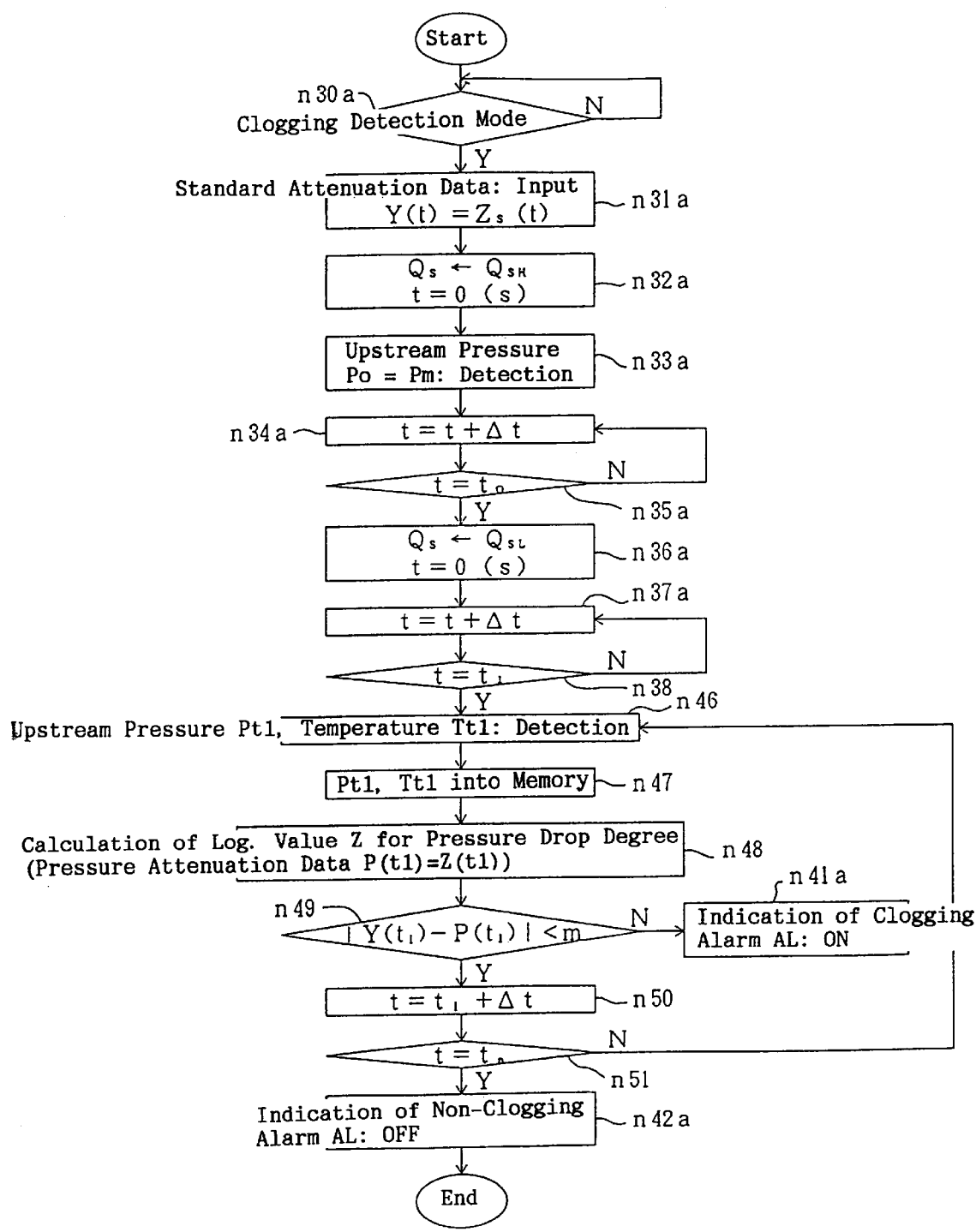
FIG. 8 is a flow chart for carrying out the method of detecting the clogging in the second embodiment of the present invention.

The second embodiment outlined in FIGS. 7 and 8 has been developed to prevent lowering of the clogging detection precision attributable to temperature differences on the upstream side of the orifice. The principle of the second embodiment is to work out the standard pressure attenuation data Y(t) and pressure attenuation data P(t) by a theoretical formula for fluid flow on the basis of the detected fluid temperature and pressure. That way, the clogging detection precision is kept from deteriorating even if the fluid temperature in working out standard pressure attenuation data Y(t) is different from the temperature in checking for clogging.

First, the method of working out standard pressure attenuation data Y(t) will be described. This standard pressure attenuation data Y(t) represents the pressure attenuation upstream of the orifice with the orifice in FIG. 1 not clogged at all.

Referring to FIGS. 1 and 7, a program stored in the storage memory M is started by a trigger signal from the external circuit 44.

It is first confirmed that the mode is for standard pressure attenuation (Step n20a), and then the set flow rate $Q_S$ is set to the high set flow rate $Q_{SH}$ in the central processing unit CPU (Step n21a). This high set flow rate $Q_{SH}$ is usually 100 percent of the full scale. In that state, the upstream pressure $P_1$ is determined and indicated as the maximum value $P_m = P_0$ in this range (Step n22a). The high set flow rate $Q_{SH}$ set as the set flow rate $Q_S$ by the trigger signal from the external circuit 44(Step n21a) is held in that state for two seconds. After that, the flow rate $Q_S$ is set to the low set flow rate $Q_{SL}$. This moment is designated as t=0 second (Step n23a). The low set flow rate $Q_{SL}$ is usually 0 percent of the full scale. That is, the attenuation of the upstream pressure $P_1$ is measured with the upstream pressure $P_1$ switched from the maximum to zero (full closure of the control valve).

Measurement is started at t=0. The upstream pressure $P_1 = P_t$ and the upstream temperature $T_1 = T_t$ are measured (Step n43a). Time, pressure data, and temperature data (t, $P_t$, $T_t$) are put into the storage memory M (Step n44a). Measurement is repeated at an interval of a small amount of time Δt (Step n26a) and continued until the end of the measuring time $t_m$ (Step n27a) and stored in the storage memory M. The measuring time $t_m$ may be, for example, 5 seconds or 20 seconds. It is sufficient if required data are obtained over that time.

For actual measurement, it is so arranged that the measuring time $t_m$ is selectable from among 8 courses ranging in duration from one second to 10 seconds and usually set to one of those courses for pressure measurement. In the case of an orifice with a bore or inside diameter of 150 microns, the upstream pressure $P_1$ and the upstream temperature $T_1$ are measured 50 times in one course or during the measuring time $t_m$.

Along with the measurement of the upstream pressure $P_1$ and the upstream temperature $T_1$, the central processing unit CPU works out standard pressure attenuation data $Y(t) = Z_S(t)$ from those read data (Step n45a). The calculated standard pressure attenuation data $Y(t) = Z_S(t)$ are put into the storage memory M.

In the second embodiment, the standard pressure attenuation data $Y(t) = Z_S(t)$ is worked out by calculating the drop in the upstream pressure $P_1$ according to what is called the theoretical formula of fluid and a value $Z_S(t)$ that logarithmically indicates the degree of drop in the upstream pressure $P_1$ is calculated in the central processing unit CPU.

In the present embodiment, the following formula (I) is used as "theoretical formula of fluid."

$$LN \frac{P_t}{P_o} = -\frac{SC_t\sqrt{R_t T_t}}{V} t_n \tag{I}$$

where $P_o = P_m$: initial time (standard time) upstream pressure $P_1$; $P_t$: upstream pressure at lapse of time t; S: cross-sectional area of the orifice 2; $C_t$: constant of specific heat ratio of gas at time t; $R_1$: gas constant at time t; $T_t$: upstream temperature at time t; V: internal volume of the flow rate control system FCS; and $t_n$: time after the start of measurement (unit time×n).

The constant C of the specific heat ratio of gas is given in the following formula (II):

$$C = \left(\frac{2}{k+1}\right)^{1/k-1} \cdot \sqrt{\frac{k}{k+1}} \tag{II}$$

where k: specific heat ratio of gas.

The value $Z_S(t)$ that logarithmically indicates the degree of drop in the upstream pressure $P_o$ is given in the formula (III):

$$Z_S(t) = \frac{C_o\sqrt{R_o \cdot T_o}}{C_t\sqrt{R_t \cdot T_t}} xLN \frac{P_t}{P_o} \tag{III}$$

$$= \frac{C_o\sqrt{R_o \cdot T_o}}{C_t\sqrt{R_t \cdot T_t}} x - \frac{SC_t\sqrt{R_t \cdot T_t}}{V} tn$$

where $C_o$, $R_o$ and $T_o$ are the constant of gas specific heat ratio, gas constant, and upstream temperature respectively at the initial time (the standard time) and $C_t$, $R_t$, and $T_t$ are the constants of gas specific heat ratio, gas constant upstream temperature at the time t (n'th round of measurement) respectively.

Standard pressure attenuation data $Y(t) = Z_S(t)$ at $t_1, t_2 \ldots t_n$ counted from the measurement starting time t=0 are worked out by the formula (III) in the central processing unit CPU. The results are successively put into the storage memory M.

There will now be described the detection of the clogging of the orifice that is actually practiced.

FIG. 8 is a flow chart for the mode of checking orifice clogging according to the second embodiment. It is difficult to detect the clogging when the plant is in operation. Therefore, it is so arranged that when the set flow rate falls to a certain value—a threshold value that can be set at any value exceeding one volt—after the production process ends in the plant, the falling trend of the voltage will start up the clogging detection mode as trigger signal.

In the present example, if the set flow rate falls to one volt, then the trigger signal $T_{ri}$, is input in the central processing unit CPU. It is confirmed from this signal that the mode is for detection of the clogging (Step n30a). And the storage memory M sends standard pressure attenuation data Y(t) to the central processing unit CPU (Step n31a). The data may be either $Y(t)=Z_S(t)$ for the gas actually being measured or the standard pressure attenuation data $Z_S(t)$ for $N_2$ gas multiplied by a constant A for the flow factor FF predetermined according to the kind of gas.

In the next step, the high set flow rate $Q_{SH}$ is input. With this moment designated as t=0 in a pressure measuring cycle as shown in Table 2, the time counting is started (Step n32a), and the upstream pressure $P_1$ is measured. This measurement is taken as the maximum pressure $P_m$ (Step n33a). Time counting (with measurement) is repeated a number of times at an interval of a small amount of time Δt (Step n34a) until a set time—the high set time $t_o$—comes around (Step n35a). Then, the flow rate is switched to the low set flow rate $Q_{SL}$ with the time counting reset to t=0 second (Step n36a). In the present example, it is so arranged that the high set time $t_0$ comes 2 seconds after the high set flow rate $Q_{SH}$ is input, with the high set flow rate $Q_{SH}$ set to 100 percent and the low set flow rate $Q_{SL}$ set to 0 percent as mentioned earlier. The high set time $t_0$ may be selected at any point as long as it is the time where the upstream pressure $P_1$ is stabilized.

Further, time counting (with measurement) is repeated many times at an interval of a small amount of time Δt (Step n37a) until another set time—the low set time $t_1$—comes around (Step n38a). Then, the upstream pressure $Pt_1$ and the upstream temperature $T_{t1}$ are detected (Step n39a). The upstream pressure $P_{t1}$ and the upstream temperature $T_{t1}$ thus detected are put into the storage memory as necessary (Step n47a). In the next step, the central processing unit CPU works out values logarithmically indicating the degree of pressure attenuation of the pressure $P_{t1}$ on the primary side, that is, pressure attenuation data $P_{t1}=Z(t_1)$ (Step n48).

The calculated pressure attenuation data $P(t_1)=Z(t_1)$ is checked against the standard pressure attenuation data $Y(t_1)$ which has been put into the storage memory M (Step n49). If $|P(t_1)—Y(t_1)|$ is outside the allowable error range m, the display indicates clogging with the alarm AL turned on (Step n41).

If $|P(t_1)—Y(t_1)|$ is within the allowable error range m, the time is advanced (Step n50), and the second round of measurement, calculation, and comparison is repeated at $t=t_2$. If the process is repeated until $t=t_n(n=51)$, no clogging is indicated on the display with the alarm turned off (Step n42a).

In the mode for detection of the clogging in FIG. 8 according to the second embodiment, pressure attenuation data $P(t_1)=Z(t_1)$ is worked out in step n48. On basis of that data, clogging is checked for. If no clogging is found, the time is advanced in Step 51 for the next measurement of the upstream pressure $P_1$ and the upstream temperature $T_1$.

Alternatively, it may be so arranged that along with continuously measuring the upstream pressure $P_1$ and the upstream temperature $T_1$ at each time unit in step n46, pressure attenuation data $P(t_1)$ at each time unit is calculated in step n48 so that, on the basis of this calculated value, clogging is checked for at each unit time.

Figure 9:
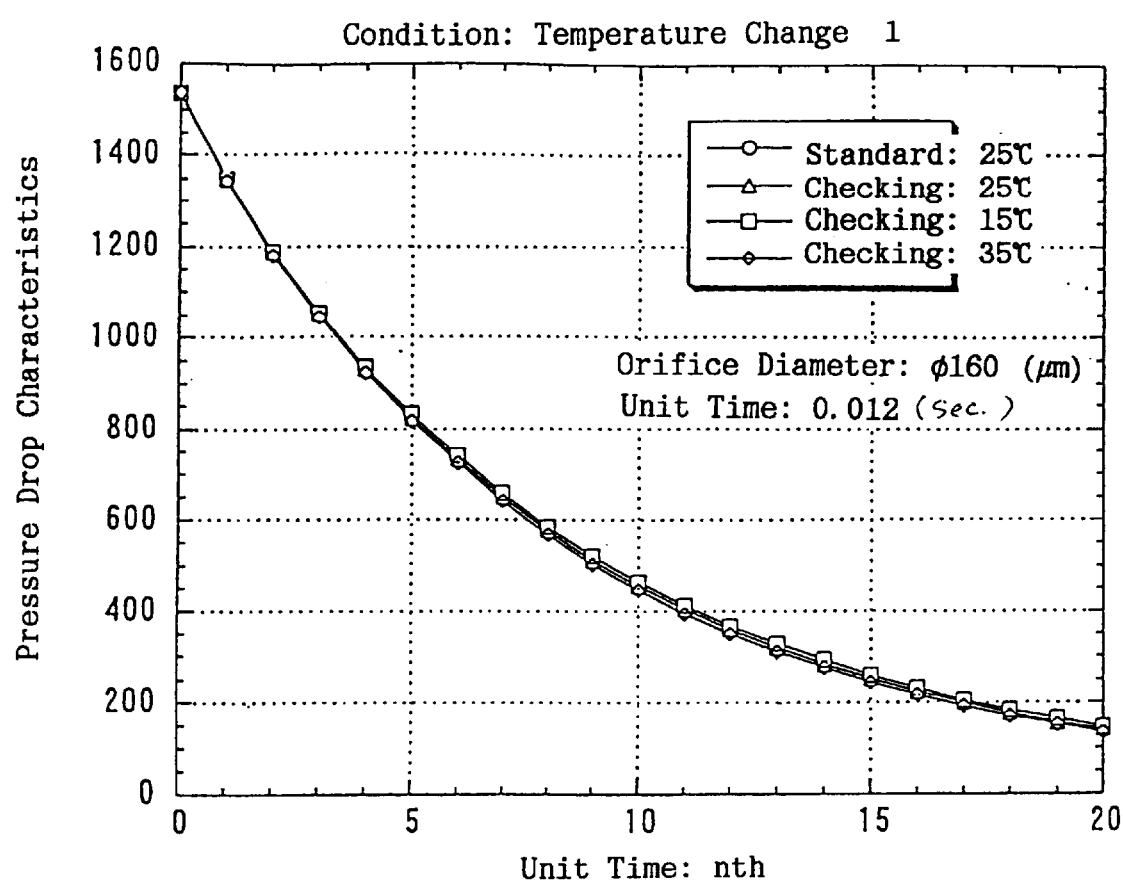
FIG. 9 is a graph showing the pressure drop characteristics with temperatures changed in the second embodiment of the present invention.
Figure 10:
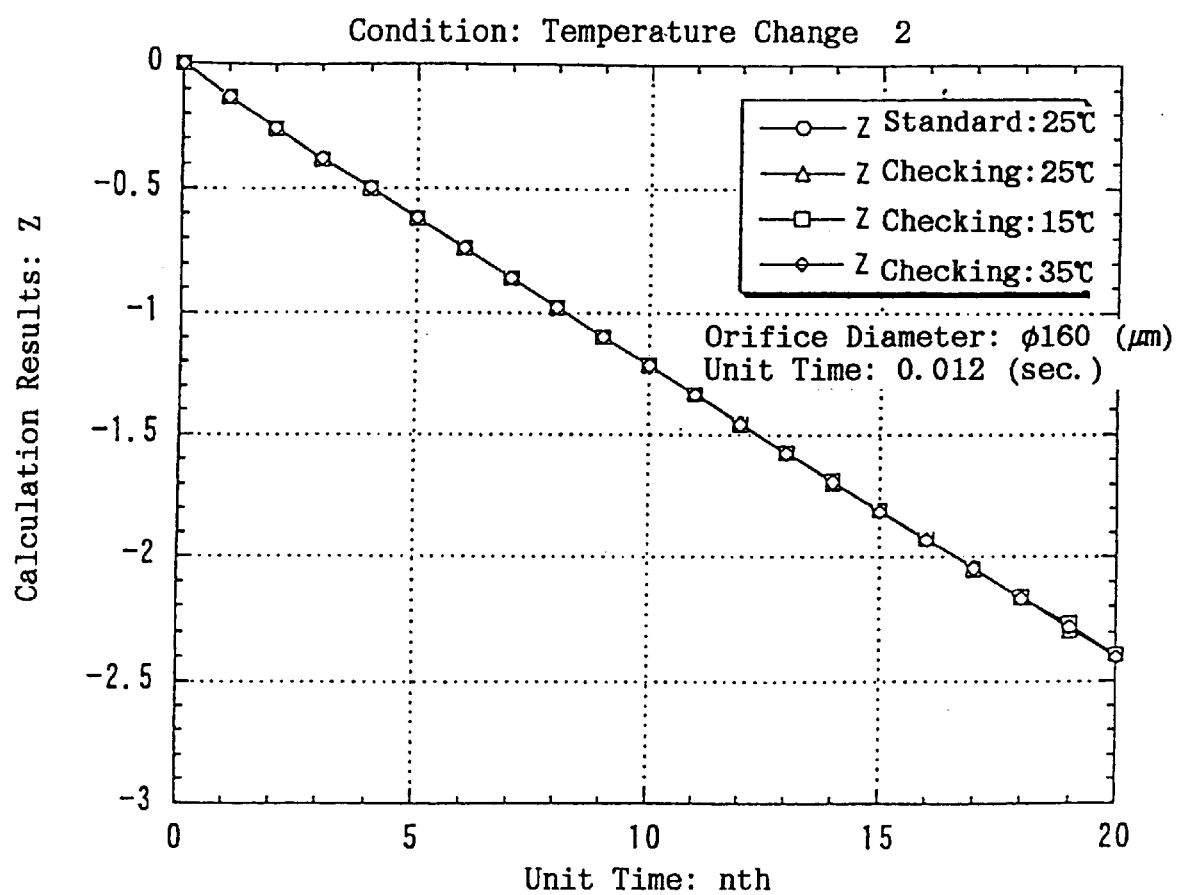
FIG. 10 a graph showing calculated values of pressure attenuation data Z(t) with temperatures changed in the second embodiment of the present invention.
Figure 11:
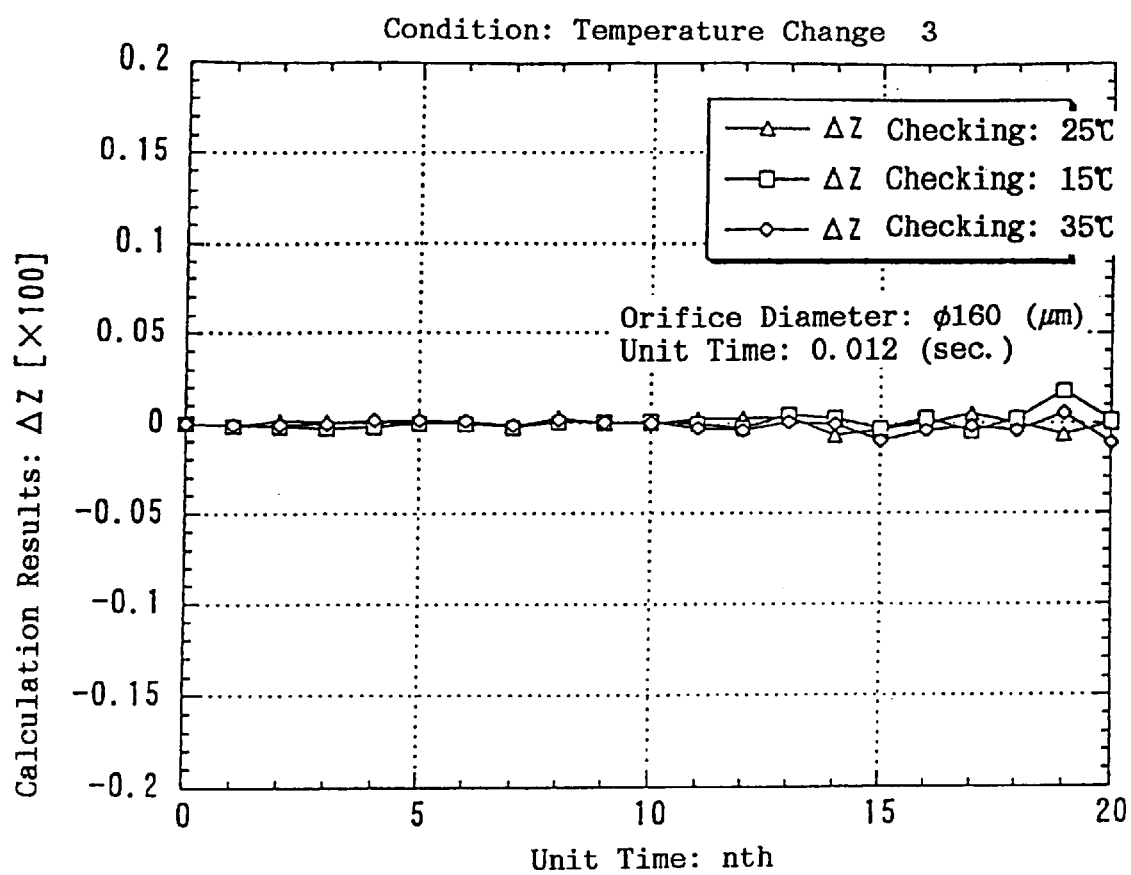
FIG. 11 depicts curves showing differences between standard time pressure attenuation data $Z_S(t)$ measured at 25° C. and calculated data of pressure attenuation data measured with temperatures changed.

FIGS. 9, 10 and 11 show the results of checking the orifice for clogging according to the second embodiment of the present invention. Shown in FIG. 9 are the pressure drop characteristics measured with an orifice diameter of 160 microns, at unit time t (0.012 sec), standard temperature 25° C., and temperature changes: standard temperature 25° C.+10° C. and standard temperature 25° C.−10° C. Shown in FIG. 10 are the calculation results of Z(t). And depicted in FIG. 11 are differences between calculated values $Z_S(t)$ (25° C.) at the standard time and calculated values Z(t) at the time of checking the orifice clogging.

In the case of the second embodiment, as illustrated in FIGS. 9 and 10, even if the temperature T(t) at the time of the clogging checking is 10° C. higher or lower than the standard time temperature (25° C.), pressure drop characteristics (FIG. 9) and calculated values Z(t) are almost the same as the ones at the standard time temperature (25° C.). That shows that the error attributable to a temperature difference is almost completely corrected.

As a result, the orifice can be checked for clogging with high reliability even if the measured temperature on the upstream side is much different from the gas temperature reading at the time when the standard pressure attenuation data was obtained.

As set forth above, the present invention is to check the pressure attenuation data P(t) measured in actual operation against standard pressure attenuation data Y(t) measured with the orifice not clogged, and to judge if the orifice is clogged or not by checking whether P(t) deviates from Y(t) by more than a specific degree. Therefore, it is possible to check for clogging of the orifice in a very simple process without breaking up or disassembling the piping. That precludes the possibility of emergencies such as explosions, and ensures the safety of plants.

In other words, the present invention provides an inexpensive and reliable method and apparatus for detecting orifice clogging, and contributes to the extensive use of pressure-type flow rate control systems having an orifice.

Especially the second embodiment of the present invention permits checking the orifice for clogging with high reliability, eliminating the error caused by the temperature difference even if the temperature T(t) on the upstream side at the time of checking for clogging is much apart from the gas temperature reading at the time when the standard pressure attenuation data was obtained.

What is claimed is:

1. A method of detecting clogging of an orifice in a pressure-type flow rate controller which has a control valve (CV), an orifice (2), a pressure detector (14) for measuring the upstream pressure $P_1$ therebetween, and a flow rate setting circuit (32) wherein, with the upstream pressure $P_1$ maintained about two or more times higher than the downstream pressure $P_2$, the downstream flow rate $Q_C$ is calculated with the equation $Q_C=KP_1$(K=constant) and wherein the control valve (CV) is controlled on the basis of the difference signal $Q_Y$ between the calculated flow rate $Q_C$ and the set flow rate $Q_S$, said method comprising:

a first step of holding the set flow rate $Q_S$ at a high set flow rate $Q_{SH}$, a second step of switching from the high set flow rate $Q_{SH}$ to a low set flow rate $Q_{SL}$ and maintaining the low set flow rate $Q_{SL}$ and determining the upstream pressure $P_1$ to obtain the pressure attenuation data P(t), a third step of checking said pressure attenuation data P(t) against standard pressure attenuation data Y(t) measured under the same conditions as with the pressure attenuation data P(t) but with the orifice not clogged, and a fourth step of turning on a clogging alarm when the pressure attenuation data P(t) deviates from standard pressure attenuation data Y(t) by at least a specific degree.

2. The method of detecting clogging of an orifice in a pressure-type flow rate controller as defined in claim 1, wherein, with the high set flow rate $Q_{SH}$ at 100 percent of the flow rate (full scale flow rate) and the low set flow rate $Q_{SL}$ at 0 percent (the control valve kept completely closed), the clogging alarm will be turned on when the pressure attenuation data P(t) at the lapse of a specific time after the switching of the flow rate to the low set flow rate deviates from standard pressure attenuation data Y(t) by at least a specific degree.

3. The method of detecting clogging of an orifice as defined in claim 1 or claim 2, wherein standard pressure attenuation data Y(t) and pressure attenuation data P(t) are given in the form of Y(t)=exp (−kt) where k is an attenuation parameter.

4. A method of detecting clogging of an orifice in a pressure-type flow rate controller which has a control valve (CV), an orifice (2), a pressure detector (14) for measuring the upstream pressure $P_1$ therebetween, and a flow rate setting circuit (32) wherein, with the upstream pressure $P_1$ maintained about two or more times higher than the downstream pressure $P_2$, the downstream flow rate $Q_C$ is calculated with the equation $Q_C = KP_1$ (K=constant) and wherein the control valve (CV) is controlled by the difference signal $Q_Y$ between the calculated flow rate $Q_C$ and the set flow rate $Q_S$, the method comprising:

a first step of holding the set flow rate $Q_S$ at the high set flow rate $Q_{SH}$;

a second step of switching from the high set flow rate $Q_{SH}$ to the low set flow rate $Q_{SL}$ and maintaining the low set flow rate $Q_{SL}$, measuring the upstream pressure $P_1$ and the upstream temperature $T_1$, and working out pressure attenuation data P(t) from those measured values;

a third step of checking said pressure attenuation data P(t) against standard pressure attenuation data Y(t) worked out from the upstream temperature $T_1$ and the upstream pressure $P_1$ measured under the same conditions as with the pressure attenuation data P(t) but with the orifice not clogged; and a fourth step of turning on a clogging alarm when the pressure attenuation data P(t) deviates from standard pressure attenuation data Y(t) by at least a specific degree.

5. The method of detecting clogging of an orifice as defined in claim 4, wherein, with the high set flow rate $Q_{SH}$ at 100 percent of the flow rate (full scale flow rate) and the low set flow rate $Q_{SL}$ at 0 percent (the control valve kept completely closed), the clogging alarm will be turned on when the pressure attenuation data P(t) at the lapse of a specific time after the switching of the flow rate to the low set flow rate deviates from standard pressure attenuation data Y(t) to at least a specific degree.

6. The method of detecting clogging of an orifice as defined in claim 4 or claim 5, wherein the standard pressure attenuation data Y(t) and pressure attenuation data P(t) are worked by the formula:

$$Y(t)(\text{or } P(t)) = \frac{C_o\sqrt{R_o \cdot T_o}}{C_t\sqrt{R_t \cdot T_t}} xLN\frac{P_t}{P_o}$$

where $P_o$, $C_o$, $R_o$, and $T_0$ are the standard time upstream gas pressure, constant of gas specific heat ratio, gas constant, and gas temperature, respectively, and $P_t$, $C_t$, $R_t$, and $T_t$ are the arrival time upstream gas pressure, constant of gas specific heat ratio, gas constant, and upstream temperature, respectively.

7. An apparatus for detecting clogging of an orifice in a pressure-type flow rate controller which has a control valve (CV), an orifice (2), a pressure detector (14) for measuring the upstream pressure $P_1$ therebetween, and a flow rate setting circuit (32) wherein, with the upstream pressure $P_1$ maintained about two or more times higher than the downstream pressure $P_2$, the downstream flow rate $Q_C$ is calculated with the equation $Q_C=KP_1$(K=constant) and wherein the control valve (CV) is controlled by of the difference signal $Q_Y$ between the calculated flow rate $Q_C$ and the set flow rate $Q_S$, said apparatus comprising:

a storage memory M memorizing standard pressure attenuation data Y(t) of the upstream pressure $P_1$ measured with the flow rate switched from the high set flow rate $Q_{SH}$ to the low set flow rate $Q_{SL}$ with the orifice (2) not clogged, a pressure detector (14) for determination of the pressure attenuation data P(t) of the upstream pressure $P_1$ with the flow rate switched from the high set flow rate $Q_{SH}$ to the low set flow rate $Q_{SL}$ with the orifice (2) in the actual conditions, a central processing unit CPU for checking the pressure attenuation data P(t) against standard pressure attenuation data Y(t), and an alarm circuit (46) for turning on a clogging alarm when the pressure attenuation data P(t) deviates from standard pressure attenuation data Y(t) by at least a specific degree.

8. The apparatus for detecting clogging of an orifice as defined in claim 7, wherein standard pressure attenuation data Y(t) and pressure attenuation data P(t) are given in the form of Y(t) {or P(t)}=exp (−kt) where k is an attenuation parameter.

9. An apparatus for detecting clogging of an orifice in a pressure-type flow rate controller which has a control valve (CV), an orifice (2), a pressure detector (14) for measuring the upstream pressure $P_1$ therebetween, and a flow rate setting circuit (32) wherein with the upstream pressure $P_1$ maintained about two or more times higher than the downstream pressure $P_2$, the downstream flow rate $Q_C$ is calculated with the equation $Q_C=KP_1$(K=constant) and wherein the control valve (CV) is regulated by the difference signal $Q_Y$ between the calculated flow rate $Q_C$ and the set flow rate $Q_S$, the apparatus comprising:

a pressure detector (14) for measuring the pressure $P_1$ upstream of the orifice;

a temperature detector (24) for detecting the upstream temperature $T_1$;

a storage memory M memorizing standard pressure attenuation data Y(t) of the upstream pressure $P_1$ worked out from the upstream temperature $T_1$ and the upstream pressure $P_1$ measured with the flow rate switched from the high set flow rate $Q_{SH}$ to the low set flow rate $Q_{SL}$ with the orifice (2) not clogged;

a central processing unit CPU for working out the standard pressure attenuation data Y(t), calculating the pressure attenuation data P(t) for the upstream pressure $P_1$ on the basis of the upstream pressure $P_t$ and upstream temperature $T_t$ measured with the flow rate switched from the high set flow rate $Q_{SH}$ to the low set flow rate $Q_{SL}$ with the orifice (2) in the actual conditions, and checking the pressure attenuation data P(t) against the standard pressure attenuation data Y(t); and an alarm circuit (46) for turning on a clogging alarm when the pressure attenuation data P(t) deviates from standard pressure attenuation data Y(t) to at least a specific degree.

10. The apparatus for detecting clogging of an orifice as defined in claim 9, wherein the standard pressure attenuation data Y(t) and pressure attenuation data P(t) are worked by the formula:

$$Y(t)(\text{or } P(t)) = \frac{C_o\sqrt{R_o \cdot T_o}}{C_t\sqrt{R_t \cdot T_t}} \times LN\frac{P_t}{P_o}$$

where $P_o$, $C_o$, $R_o$, and $T_o$ are the standard time upstream gas pressure, constant of gas specific heat ratio, gas constant, and gas temperature, respectively, and $P_t$, $C_t$, $R_t$ and $T_t$ are the arrival time upstream gas pressure, constant of gas specific heat ratio, gas constant, and upstream temperature, respectively.

* * * * *